United States Patent
Lilliesköld et al.

(10) Patent No.: US 10,935,177 B2
(45) Date of Patent: Mar. 2, 2021

(54) POWERED EMERGENCY RELEASED COUPLING CONTROL AND MONITORING SYSTEM

(71) Applicant: MANN TEKNIK AB, Mariestad (SE)

(72) Inventors: Johan Lilliesköld, Färentuna (SE); Gerhard Kopplin, Lyrestad (SE); Fredrik Adamsson, Mariestad (SE); Markus Bäckström, Mariestad (SE)

(73) Assignee: MANN TEKNIK AB, Mariestad (SE)

( * ) Notice: Subject to any disclaimer, the term of this patent is extended or adjusted under 35 U.S.C. 154(b) by 0 days.

(21) Appl. No.: 16/228,860

(22) Filed: Dec. 21, 2018

(65) Prior Publication Data

US 2019/0383435 A1 Dec. 19, 2019

Related U.S. Application Data

(63) Continuation of application No. PCT/SE2017/050731, filed on Jun. 30, 2017.

(30) Foreign Application Priority Data

Jul. 5, 2016 (SE) ...................................... 1650978

(51) Int. Cl.
*F16K 17/14* (2006.01)
*F16L 55/10* (2006.01)
(Continued)

(52) U.S. Cl.
CPC .......... *F16L 55/1007* (2013.01); *B63B 27/24* (2013.01); *F16L 29/04* (2013.01); *F17C 5/007* (2013.01); *F17C 2250/072* (2013.01)

(58) Field of Classification Search
CPC ....... F16L 55/1007; F16L 29/04; F17C 5/007; F17C 2250/072; B63B 27/24
(Continued)

(56) References Cited

U.S. PATENT DOCUMENTS

| | | | | |
|---|---|---|---|---|
| 2,921,436 A | * | 1/1960 | Canner | ................... F16L 37/32 60/787 |
| 4,361,165 A | * | 11/1982 | Flory | ...................... F16K 17/40 137/614.02 |

(Continued)

FOREIGN PATENT DOCUMENTS

| | | |
|---|---|---|
| EP | 2808293 A1 | 12/2014 |
| FR | 2638731 A1 | 5/1990 |

(Continued)

*Primary Examiner* — Minh Q Le
(74) *Attorney, Agent, or Firm* — Gabriela B. Tomescu, Esq.; Bergenstråhle & Partners AB (57) ABSTRACT

The present invention relates to a pneumatically, high pressure gas powered emergency release coupling control and monitoring system (S) comprising a powered emergency released coupling (1) arranged in a fluid-supply line (32) for conveying hazardous fluids, said powered emergency released coupling (1) comprising a couple of coupling members (10, 11) provided with mating faces (10A, 11A) for sealing engagement of the coupling members (10, 11) and formation of a pressurizable chamber (12) between said coupling members (10, 11), said system (S) comprising an actuation line (7) connected at its one end to the pressurizable chamber (12) and at its other end to a source (C) of high pressure gaseous media ($G_H$), preferably high pressure nitrogen gas, an first actuating device (4A, 4B) arranged in the actuation line (7), wherein said system (S) provides a gaseous media at a pilot pressure level to said pressurizable chamber (12) and to said actuation line (7) in a position downstream the first actuation device (4A, 4B) or via said pressurizable chamber (12) for detection of any leakage of gas in the control and monitoring system (S), said pilot pressure gaseous media preferably being low pressure nitrogen gas. The invention further relates to a pneumatically, high pressure gas powered emergency release coupling (1) and a control and monitoring method for such a system (S).

11 Claims, 5 Drawing Sheets

(51) Int. Cl.
*B63B 27/24* (2006.01)
*F16L 29/04* (2006.01)
*F17C 5/00* (2006.01)

(58) Field of Classification Search
USPC .............................................. 137/488, 68.14
See application file for complete search history.

(56) References Cited

U.S. PATENT DOCUMENTS

| | | | | |
|---|---|---|---|---|
| 4,614,201 A | * | 9/1986 | King | F16K 17/40 137/312 |
| 4,899,792 A | * | 2/1990 | Podgers | F16L 27/047 137/68.14 |
| 4,921,000 A | | 5/1990 | King et al. | |
| 1,998,560 A | | 3/1991 | Le Devehat | |
| 5,054,509 A | * | 10/1991 | Grantham | F16L 55/1007 137/68.14 |
| 5,351,708 A | * | 10/1994 | Donato | F16L 55/1007 137/614.02 |
| 5,699,822 A | * | 12/1997 | Bodhaine | F16L 29/00 137/614.04 |
| 5,826,610 A | * | 10/1998 | Bodhaine | F16L 29/00 137/68.15 |
| 5,921,266 A | * | 7/1999 | Meyer | B67D 7/3209 137/487.5 |
| 6,681,815 B1 | | 1/2004 | Westrich et al. | |
| 8,578,957 B2 | * | 11/2013 | Wolff | F16L 55/1007 137/614.04 |
| 2003/0000572 A1 | * | 1/2003 | Krywitsky | F16K 27/07 137/68.14 |

FOREIGN PATENT DOCUMENTS

| | | | | |
|---|---|---|---|---|
| KR | 20160036987 A | | 4/2016 | |
| WO | WO-8402171 A1 | * | 6/1984 | ............. B63B 27/24 |
| WO | 2016/079092 A1 | | 5/2016 | |

* cited by examiner

DETAIL A

Fig. 5

POWERED EMERGENCY RELEASED COUPLING CONTROL AND MONITORING SYSTEM

This application is the continuation of International Application No. PCT/SE2017/050731, filed 30 Jun. 2017, which claims the benefit of Swedish Patent Application No. SE 1650978-8, filed 5 Jul. 2016, the entire contents of which are hereby incorporated by reference.

TECHNICAL FIELD

The present invention relates to a pneumatically, high pressure gas powered emergency release coupling control and monitoring system comprising a powered emergency released coupling (PERC) arranged in a fluid-supply line for conveying hazardous fluids, said powered emergency released coupling comprising a couple of coupling members provided with mating faces for sealing engagement of the coupling members and formation of a pressurizable chamber between said coupling members, an actuation line connected at its one end to the pressurizable chamber and at its other end to a source of high pressure gaseous media, preferably high pressure nitrogen gas, an first actuating device arranged in the actuation line. The invention further relates to a pneumatically, high pressure gas powered emergency release coupling (PERC) and a control and monitoring method for such a system.

STATE OF THE ART

Breakaway Couplings (BAC) and Emergency Release Couplings (ERC) ensure a safe transfer of liquid and gaseous fluids by cutting the fluid transfer at a predefined applied force. The coupling is either activated by break studs (BAC) or by a mechanical, pneumatic or hydraulic collar release mechanism (ERC). BACs and ERCs may be used in many types of loading applications, for example ship to ship loading, cryogenic loading, ship to shore loading and loading of hazardous chemicals.

These couplings prevents spillage and damage to the equipment when the hose is exposed to rapidly resulting high load, such as if the driver drives off during loading or unloading. Without a hose rupture valve, the consequences of such events can be very serious. The couplings have a diverted breaking point which will break at a determined break-load whereupon the internal valves will automatically close on both sides and the flow stops immediately. This does not only guarantee the safety of employees. Environmental pollution and costly damage of the loading systems is avoided and downtime is reduced.

The document U.S. Pat. No. 4,921,000 describes a breakaway coupling device for use with a line or pipeline for conveying hazardous fluids. The coupling comprises coupling members of generally tubular form for connection at their outer ends to a hose line, pipeline or other fluid-supply or fluid-delivery point, and provided at their inner ends with complementary faces which are held in sealing engagement by frangible connectors. The coupling members have valve seats and valve members which are urged towards closing engagement with said seats but are usually being held against the springs and out of engagement with the seats until the coupling members are separated on breaking of the connectors. An annular separating ram is provided to apply pressure between the coupling members which will break the connectors and separate the coupling members, whereupon the valve members will seat under spring action and minimize spillage of the fluid being conveyed.

The document U.S. Pat. No. 5,699,822 describes a breakaway coupling device and a method for hydraulically disconnecting the breakaway coupling. The means for disconnecting the male valve body from the female valve body comprises a control system comprising an accumulator pre-charged with nitrogen, a pneumatic poppet valve connected to the accumulator, a manually controlled air supply being connected to the pneumatic poppet valve, a hydraulic pump that charges the accumulator with oil and a hydraulic cylinder that is activated by the accumulator. Alternatively, the breakaway coupling device can be separated manually.

BRIEF DESCRIPTION OF THE INVENTION

It is an object of the present invention to provide an improved control and monitoring system in connection with a breakaway coupling. This is obtained with a pneumatically/high pressure gas powered emergency release coupling control and monitoring system according to claim 1. The system is characterized in that gaseous media at a pilot pressure level is provided to the pressurizable chamber and to the actuation line in a position downstream the first actuation device or via said pressurizable chamber for detection of any leakage of gas in the control and monitoring system. The pilot pressure gaseous media is preferably low pressure nitrogen gas.

Thanks to the invention, it can be ensured that there is sufficient pressure in the control and monitoring system so that breakaway couplings (BAC) and emergency release couplings (ERC) used with a line or pipeline for conveying hazardous fluids can be pneumatically separated in case of emergency.

In order to supply the system with gaseous media a single source of high pressure gaseous media is sufficient. If convenient, separate pressure tanks may be utilized which may be located collectively or at separate locations.

If the system utilizes a separate pressure tank for provision of the pilot pressure gaseous media, it may be located in connection to the breakaway coupling (PERC) and a separate monitoring line may be connected to the pressurizable chamber of the breakaway coupling. This is convenient as the operator then may control, via a pressure indicator in the monitoring line, that the system is tight and make a check of the coupling and the actuation line if required.

In case of a separate pressure tank for the pilot pressure gaseous media, the gaseous media will flow to the actuation line via the pressurizable chamber which results in a simple and reliable system with few components.

Thanks to the coupling according to the invention, wherein a pair of annular seals, preferably lip seals, are arranged on opposite sides of an annular seal supporting member arranged in connection with the pressurizable chamber, an improved protection of penetration from surrounding media such as water, moisture air, dirt or dust into the coupling is obtained. A more reliable functionality is thereby obtained as ice is avoided or at least minimized inside the coupling. The risk of leakage of the conveyed fluid in the coupling to the outside is also minimized.

In case a simple system is desired which is independent of electricity, the actuation device/devices may be pneumatically regulated. The system may then have a second pressure regulator arranged upstream the first pressure regulator, for reducing the high pressure gaseous media from the high pressure source to a maneuvering pressure level between the high pressure level and the pilot pressure level. Alternatively, the pilot pressure level is at sufficient pressure level in order to act as maneuvering pressure wherein the second pressure regulator is not required.

It is a further object of the present invention to provide a pneumatically, high pressure gas powered emergency release coupling (PERC) comprising a couple of generally tubular coupling members provided with mating faces for sealing engagement of the coupling members. The PERC is characterized in that a first of said coupling members is provided with an annular channel having an inner wall and outer wall which extends in an axial direction of said coupling, and a bottom wall which connects the two side walls. A second of said coupling members comprises an annular seal supporting member which is arranged to be inserted into said annular channel upon connection of the two coupling members for formation of the annular pressurizable chamber between the mating faces. The seal supporting member comprises a distal head and annular grooves which forms a waist portion axially inside the distal head. A pair of annular seals, preferably a first lip seal and a second lip seal, are clamped between said waist portion and the inner wall and the outer wall of said annular channel respectively. Between the end face of the distal head and the bottom of said annular channel there is a gap. The pressurized gaseous media is supplied via a bore that opens in the gap and thanks to the gap the pressurized gaseous media can be distributed around the distal head inside the annular channel. As the pressurizable chamber is also supplied with gaseous media at the pilot pressure level before and during fueling operation, dirt, dust and humidity penetration into the PERC can be avoided and increased security against leakage of fueling media from inside the PERC is obtained. In a variant of the invention, the monitoring line is instead connected directly to the pressurizable chamber via a separate inlet. The pressurizable chamber will then act as communication channel for provision of the pilot pressure gas to the actuation line for detection of any leakage of gas in the control and monitoring system.

It is an further object of the present invention to provide a control and monitoring method for a pneumatically, high pressure gas powered emergency release coupling (PERC) control and monitoring system wherein the method comprises the steps of:
a) providing the actuation line with a pilot pressure gaseous media, preferably low pressure nitrogen gas,
b) providing the pressurizable chamber with pilot pressure gaseous media,
c) detecting and controlling said pilot pressure, and
d) alerting if said pilot pressure is below a predetermined level.

Thanks to the invention a method is provided where it is possible to detect any leakage as a preventive measure before any fueling is commenced. It is further possible to secure that the system is capable of releasing the PERC in case of an emergency situation.

BRIEF DESCRIPTION OF FIGURES

In the following, the invention will be described in greater detail with reference to the attached figures of the drawings, in which.

DETAILED DESCRIPTION OF FIGURES

The following detailed description, and the examples contained therein, are provided for the purpose of describing and illustrating certain embodiments of the invention only and are not intended to limit the scope of the invention in any way.

Figure 1:
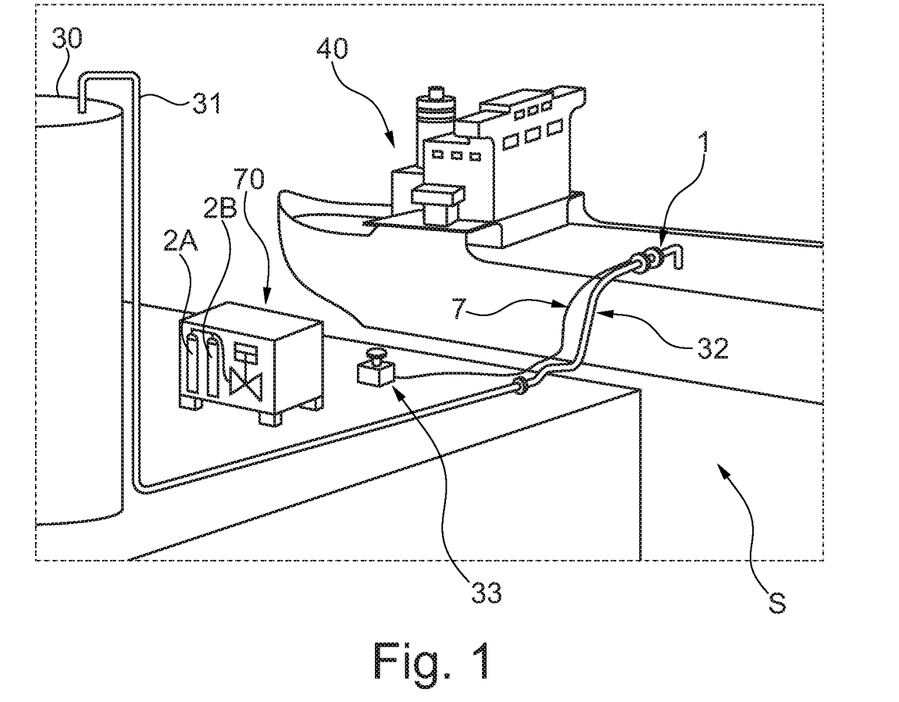
FIG. 1 illustrates an overview of the pneumatically/high pressure gas powered emergency release coupling control and monitoring system according to the invention.

FIG. 1 illustrates a liquefied natural gas (LNG) fueling operation and a schematic view of a pneumatically/high pressure gas powered emergency release coupling (PERC) 1 control and monitoring system S according to the invention. LNG from a storage tank 30 is supplied to a tanker ship 40 at the wharf, or vice versa, through a pipeline 31 having a LNG transfer hose 32 at its remote end for coupling to the tanker ship 40. A PERC valve 1 is arranged for the coupling between the LNG transfer hose 32 and the tanker ship 40 on board the tanker ship. Actuating power for the PERC valve 1 is supplied through an actuation line 7. Preferably high pressure nitrogen is used. A nitrogen cylinder 2B is contained inside a cabinet 70 along with other components. A manual PERC activation device 33 is coupled to the actuation line 7 and arranged to be easy of access at the quay. In one embodiment several PERC activation devices 33 are located in remote positions relative each other. The system S comprises a stainless steel cabinet 70 for standalone mounting on the ground.

Figure 2:
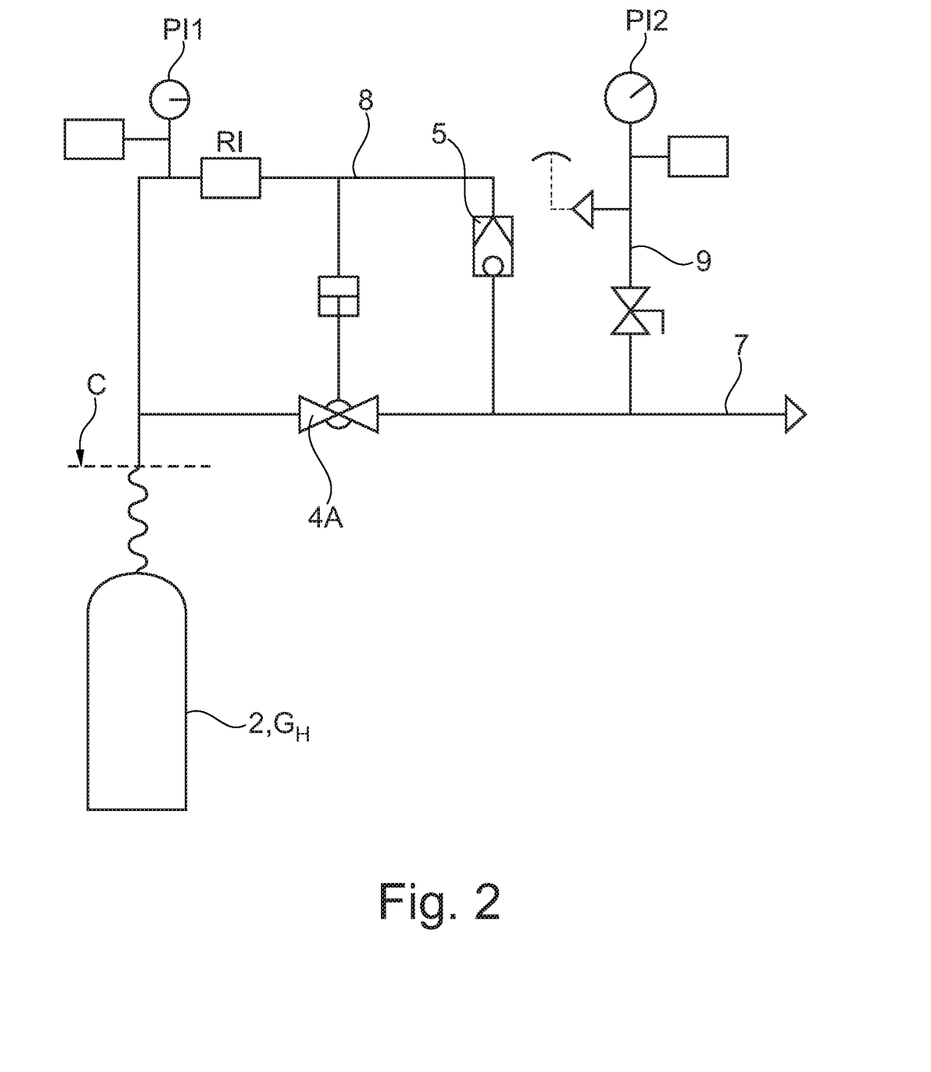
FIG. 2 illustrates an overview of the pneumatically/high pressure gas powered emergency release coupling control and monitoring system according to a first embodiment of the invention.

FIG. 2 illustrates an overview of the pneumatically/high pressure gas PERC control and monitoring system according to a first embodiment of the invention. The system comprises an actuation line 7 connected at its one end to a pressurizable chamber 12 of the PERC, see FIG. 4, and at its other end to a source C of high pressure gaseous media $G_H$, preferably high pressure nitrogen gas, here symbolized with a high pressure gas cylinder 2. A first actuating device 4A is arranged in the actuation line 7. The first actuating device 4A may be a ball valve which preferably is automatically controlled to be opened in case the PERC needs to be released in an emergency situation.

A monitoring line 8 is arranged in parallel with the first actuation device 4A. The monitoring line 8 is provided with high pressure gaseous media $G_H$ from the high pressure gas source C. In this embodiment, the monitoring line 8 is divided from the actuation line 7 upstream the first actuation device 4A. In the monitoring line 8, a first pressure indicator PI1, for monitoring the level of the high pressure gaseous media from the gas source C is arranged ahead of a first pressure regulator R1, for reducing the high pressure gaseous media $G_H$ from the gas source C to the pilot pressure level, said pilot pressure gaseous media preferably being low pressure nitrogen gas.

If the first actuation device 4A is pneumatically operated, operating gas at pilot pressure level may be provided from the monitoring line 8 to the actuator of the first actuation device 4A via an instrument line 36. In this case the pilot pressure level is somewhat higher, e.g. typically at least 6 bar, than what is otherwise required. For provision of operating gas, the monitoring line 8 may also be equipped with a second pressure regulator R2 arranged upstream the first pressure regulator R1 according to the embodiment described in connection with FIG. 3.

The monitoring line 8 is connected to the actuation line 7 in a position downstream the first actuation device 4A, for provision of the gaseous media at pilot pressure level to said actuation line 7. A check valve 5 is arranged in the monitoring line 8 before the connection to the actuation line 7. The check valve 5 prevents high pressure gas $G_H$ to flow countercurrent in case the first actuation device 4 is opened and protects the first pressure regulator R1 and the actuator of the first actuation device 4A from high pressure gas in a manner known per se.

A second pressure indicator PI2 is arranged, possibly via an instrument line 9, in the actuation line 7 downstream the first actuation device 4A for monitoring the pilot pressure level. Conventional overload protection devices for the second pressure indicator PI2 is arranged in the instrument line 9, e.g. a needle valve and a relief valve.

The function of the control and monitoring system according to the first embodiment of the invention will now be described.

Before the fueling operation is commenced, a tightness control of the actuation line 7, its associated components and the PERC 1 is performed. High pressure nitrogen gas, typically 150-200 bar, from the high pressure gas cylinder 2 is distributed to the actuation line 7 and the monitoring line 8. Before and during normal operation, the actuation device 4A is closed so high pressure nitrogen gas will not pass the actuation device 4A toward the PERC 1. Instead, high pressure nitrogen gas flows into the monitoring line 7 where a first pressure indicator PI1 controls the actual pressure. Should the pressure not be sufficient, i.e. lower than what is required to separate the PERC 1 in case of emergency, a signal is given which alerts an operator and/or prevents the fueling operation to be started. Thereafter, the first pressure regulator R1 reduces the high pressure nitrogen gas to pilot pressure level, typically 2-4 bar. The pilot pressure nitrogen gas is distributed to the actuation line 7 in a position downstream the actuation device 4A and pressurizes the actuation line 7 between the actuation device 4A and the PERC 1 as well as the pressurizable chamber 12 in the PERC 1. The second pressure indicator PI2 arranged downstream the actuation device 4A in the actuation line 7 controls the pilot pressure level of the nitrogen gas. Should the pilot pressure level be lower than the set level this indicates that there is a leakage in the actuation line 7, its associated components or in the PERC 1. Also here, a signal is given which alerts an operator and/or prevents the fueling operation to be started. If no leakage is detected, the operator may start the fueling operation.

In case of an emergency situation during fueling, the valve 4A is opened and high pressure nitrogen gas is conveyed directly from the high pressure gas cylinder 2 through the actuation line 7 to the pressurizable chamber 12 in the PERC 1 for separation of the PERC 1 and interruption of the fueling operation. The check valve 5 downstream the first pressure regulator in the monitoring line prevents backflow of high pressure nitrogen gas into the monitoring line 8 which otherwise would risk to overload/damage the pneumatic actuator of the actuating device 4A and the first pressure regulator.

Both the high pressure level and the pilot pressure level of the nitrogen gas are monitored during the fueling operation by the first pressure indicator PI1 and the second pressure indicator PI2 respectively. Should the pressure fall for some reason, a signal is given which alerts an operator who may stop the fueling operation and make a check of the system S. However, the operator may also decide to continue the fueling operation as there is always the option of separating the PERC by pulling force. However, the aim with the inventive control and monitoring system S is to avoid to have to separate the PERC 1 and instead interrupt an ongoing fueling operation or desist from commencing.

The primary purpose with the control and monitoring system S according to the invention is to control that the whole pressurization system, from the source C all the way to the chamber 12 in the powered emergency release coupling 1, does not leak gas. Before the fueling operation is started the PERC is therefore checked against any leakage, including checking the pressurization system S. A checklist is preferably followed and if everything is OK bunkering is commenced. If the control and monitoring system S alerts during the bunkering process that the pressurization system is leaking, the bunkering is preferably interrupted since the release function will not work if the gas pressure is insufficient.

Provision of pilot pressure nitrogen gas to the monitoring line 7 and low pressure pressurization of the PERC 1 and the actuation line 7 has the further advantage that any water, moisture, dirt or dust is prevented from entering the PERC which otherwise would risk to freeze and disturb the operation of the PERC.

Figure 3:
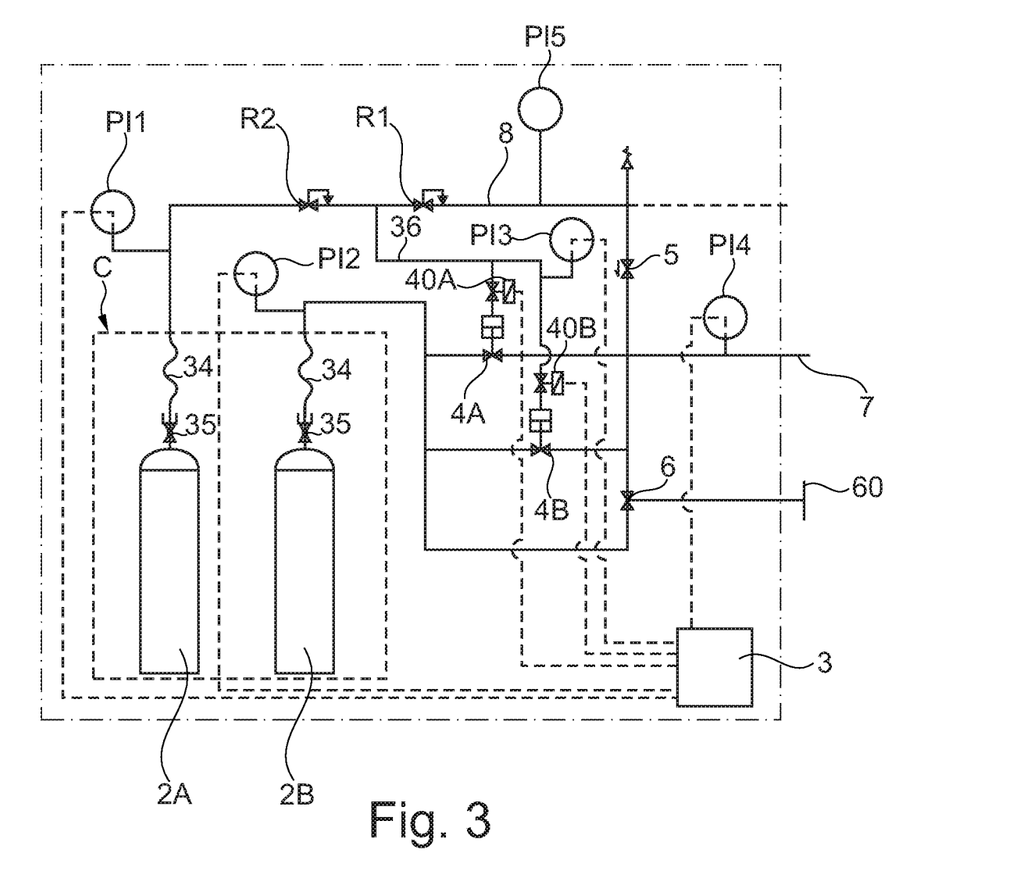
FIG. 3 illustrates a circuit diagram according to a second, preferred embodiment of the invention.

FIG. 3 illustrates a circuit diagram according to a second, preferred embodiment of the invention. The source C of high pressure gaseous media comprises a first nitrogen cylinder 2A and a second nitrogen cylinder 2B. The first cylinder 2A and the second cylinder 2B are preferably connected to the pneumatically/high pressure gas PERC control and monitoring system S by high pressure hoses 34 with nitrogen couplings 35, for easy replacement of the cylinders 2A, 2B.

The first nitrogen cylinder 2A supplies high pressure nitrogen gas to the monitoring line 8. In a first pressure regulator R1 the high pressure gaseous media $G_H$ from the source C is pressure reduced to a pilot pressure gaseous media. Optionally, a second pressure regulator R2 is arranged upstream the first pressure regulator R1 where the high pressure gaseous media $G_H$ from the source C is pressure reduced to a maneuvering pressure level suitable for pneumatic actuators. The so obtained so called instrument nitrogen gas has a pressure level typically in the range of 6-10 bar while the pilot pressure level is typically in the interval of 2-4 bar.

The monitoring line 8 is connected to the actuation line 7, for controlling and monitoring the tightness of the actuation line 7, its associated components and the PERC 1. As described in connection to FIG. 2, the monitoring line 8 is connected to the actuation line in a position downstream the actuation device 4A. In a conceivable variant, however, the monitoring line 8 is instead connected directly to the pressurizable chamber 12, which is indicated with the dotted line 8A. The pilot pressure gas is then provided to the actuation line 7 via the pressurizable chamber 12 for detection of any leakage of gas in the control and monitoring system S.

The second nitrogen cylinder 2B supplies high pressure nitrogen gas to the actuation line 7 which is connected to the pressurizable chamber 12 of the PERC 1. For the PERC 1 actuation power in the preferred embodiment there are two actuation devices, a first actuation device 4A and a second actuation device 4B, which are redundantly arranged in parallel, in a conventional manner. The release of the PERC 1 is made remotely by an electrical signal to the actuation devices 4A, 4B which opens, preferably simultaneously, resulting in high pressure nitrogen gas being transmitted to the PERC 1 for release. There is also a manual emergency PERC release valve 6 that can be operated via a handle 60 from outside of the cabinet 70 arranged as a third opening security in parallel with the two actuation devices 4A, 4B. This valve is locked by a weak link in normal position and can be operated by moderate hand force. The purpose of the weak link is to prevent unintentional operation. For the manual emergency PERC release valve 6 there is a circuit breaker on the handle giving a signal to an overall control system. LNG offloading shall not be possible unless the valve 6 is in closed position.

As shown in the circuit diagram, the instrument nitrogen gas is distributed from the monitoring line 8 via an instrument gas line 36 to pneumatic actuators 40A, 40B of the two actuation devices 4A, 4B. The pneumatic actuators are connected to a junction box 3 in the cabinet C which communicates with an overall control system.

The cabinet 70 is a ventilated weather protection designed to be free standing outside, however it may be designed differently than described here. The components may also be arranged together with other components in another cabinet, or indoors, although it is preferable that the cabinet is placed in connection to the quay for easy access and supervision during connection of the PERC 1. For easy visual inspection of the different pressures, manometers are placed in the cabinet C, preferably visual from the outside. A first manometer PI1 is arranged in the first part of the monitoring line 8 for supervision of the pressure of the incoming nitrogen gas from the first cylinder 2A, the second manometer PI2 is likewise arranged in the first part of the actuation line 7 for supervision of the pressure of the incoming nitrogen gas from the second cylinder 2B. In the described example the pressure is 200 bars in both tanks. A third manometer PI3 is arranged for supervision of the instrument gas pressure, i.e. after the first pressure regulator R1. A fourth manometer PI4 is arranged for pressure monitoring of the pressure outlet to the PERC valve 1. A fifth manometer PI5 is arranged for supervision of the pilot pressure after the second pressure regulator R2, the pilot pressure acting on the pressurizable chamber 12 in the PERC valve 1. The first to fourth manometers are connected to the junction box 3 in the cabinet C. The system S is preferably connected to an overall control system for supervision and control of the release function. The electrical equipment is connected to a junction box in the cabinet. For electrical wiring access to the junction box there is an opening in the bottom of the cabinet. The connection for the PERC actuation line 7 is on the backside and the manual emergency PERC release valve 6 is located on the right hand side of the cabinet. The connections are three pressure transmitters (EXd) for supervision and two solenoid valves (also EXd) for actuation. The electrical equipment is connected to the junction box 3 in the cabinet C. The monitoring connections are to four pressure transmitters for supervision of the two bottles (PT1 och PT2). N2 instrument pressure (PT3), pilot pressure (PT4) and two solenoid valves for actuation. Piping and fittings are preferably made in stainless steel, 316, material and pressure tested as a final assembly.

Figure 4:
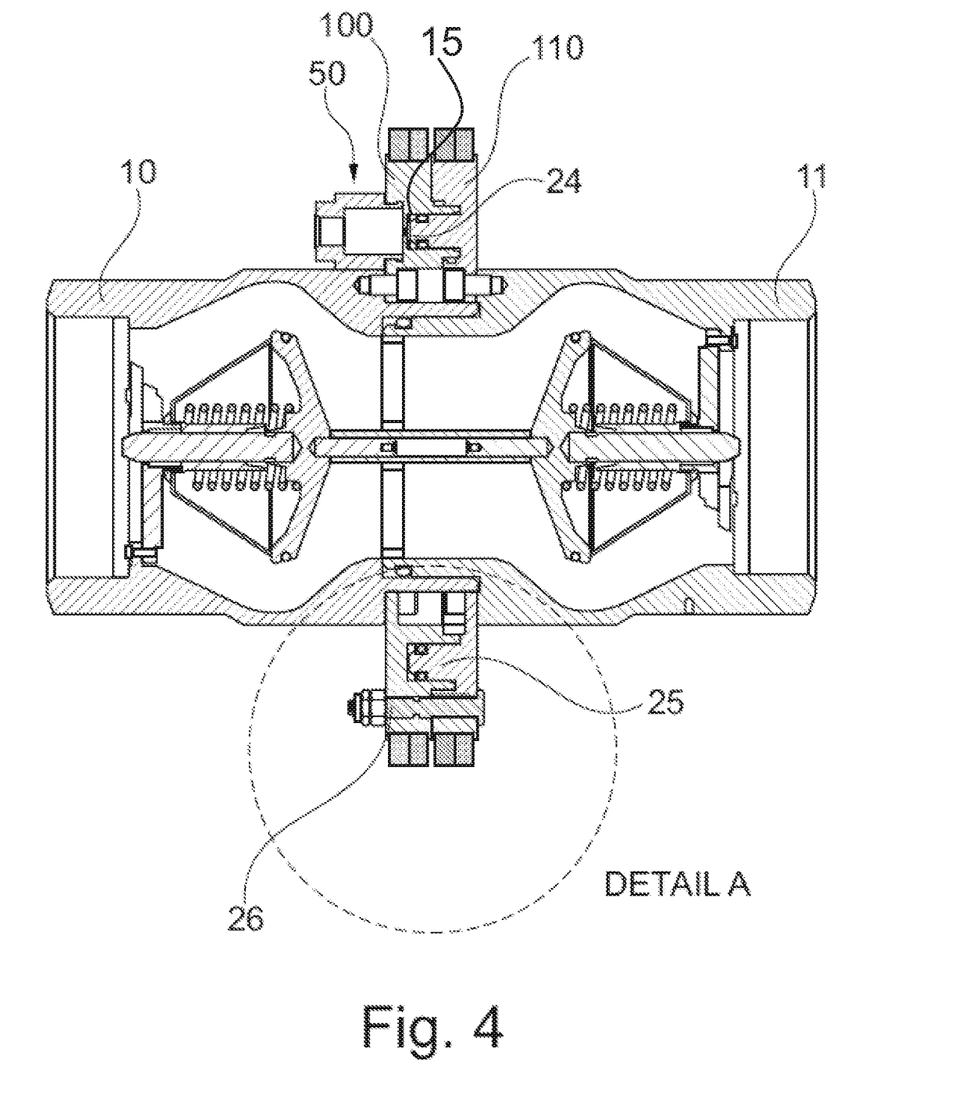
FIG. 4 illustrates a powered emergency release coupling (PERC) according to the invention

FIG. 4 shows a cross section of a PERC 1 according to the invention. The PERC 1 is a spring loaded disc valve which opens upon coupling to allow fluid to pass and closes upon separation in a manner known per se for PERC valves. Break studs 26 are arranged in the mounting flanges 100, 110 which will break at a predetermined pulling force which is exerted upon the valve either by pulling the transfer hose 32 or applying gas at high pressure to the pressurized chamber 12 in a manner known per se. However, other kinds of spring loaded PERC valves may be selected which works in a similar manner. The interior mechanism and the arrangement of the break studs will therefore not be described further as it is not essential for the inventive concept.

The PERC 1 comprises a first 10 generally tubular coupling member and a second 11 generally tubular coupling member which are provided with radial mounting flanges 100, 110 having mating faces 10A, 11A for sealing engagement of the coupling members 10, 11. The first coupling member 10 comprises an annular channel 15 and the second coupling member comprises an annular seal supporting member 16 which is arranged to be inserted into the annular channel 15 upon connection of said coupling members 10, 11 for formation of an annular pressurizable chamber 12 between said mating faces 10A, 11A. For supply of pressurized gas to the pressurizable chamber 12, a bore 24 is arranged in the bottom of the annular channel 15 which opens to a nozzle 50 on the outside of the mounting flange 100 for coupling of the actuation line 7 to the PERC 1. In case of the variant where the monitoring line 8 is separately connected to the pressurized chamber 12, a second nozzle 51 is arranged at a second bore (not shown) in a similar way. The pilot pressure gas from the monitoring line 8 is then allowed to flow into the pressurizable chamber 12 and be distributed to the actuation line 7 via the pressurized chamber 12, thereby allowing the control and monitoring of the tightness according to the inventive concept. The pressurizable chamber 12 is described in detail in relation to FIG. 5.

Figure 5:
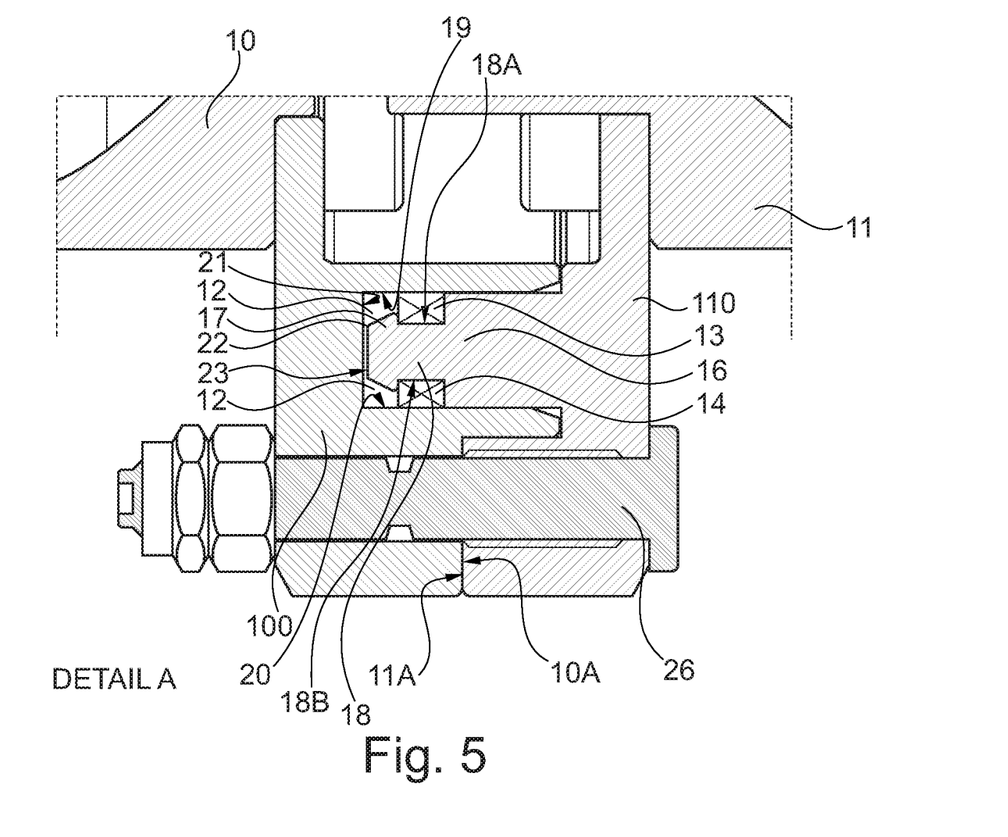
FIG. 5 illustrates a detail of the inventive PERC.

In FIG. 5 is shown the view in detail A of a PERC 1 according to the invention in a coupled state. The detail A shows a cross section of the mounting flanges 100, 110 where a break stud 26 (one of several break studs) holds the coupling halves 10, 11 coupled via mounting holes in the mounting flanges 100,110. Radially inside the break stud 26 there is an annular channel 15, which is arranged in the first mounting flange 100 of the first coupling member 10, and the seal supporting member 16, which is arranged in the second mounting flange 110 of the second coupling member 11. The pressurizable chamber 12 is formed in the coupled state when the seal supporting member 16 is positioned inside the annular channel 15.

The annular channel 15 has an inner side wall 19 and an outer side wall 20 which extend in an axial direction of said coupling 1. It further has a bottom wall 21 which connects the two side walls 19, 20. The annular seal supporting member 16 has the form of a cylindrical wall which extends in an axial direction of the PERC 1. The cylindrical wall 16 is arranged to be inserted into said annular channel 15 upon connection of said coupling members 10, 11 for formation of an annular pressurizable chamber 12 between the mating faces 10A, 11A of the mounting flanges 100, 110. The cylindrical wall 16 comprises a distal head 17 and annular grooves 18A, 18B arranged on opposite side of the wall 16, said grooves 18A, 18B forming a waist portion 18 axially inside the distal head 17. A pair of annular seals 13, 14, preferably a first lip seal 13 and a second lip seal 14, are arranged in the annular grooves 18A, 18B and are clamped between said waist portion 18 and the inner wall 19 and the outer wall 20 of said pressurizable chamber 12 respectively. The length of the seal supporting member 16 is smaller than the depth of the annular channel 15 in order to allow a gap 22 to be formed between the end face 23 of the distal head 17 and the bottom wall 21 of the annular channel 15. The distal head 17 further has a smaller width than the width of the annular channel 15 in order to facilitate the introduction of the seal supporting member 16 into the annular channel. A space is thereby formed around the distal head 17, which space extends between the inner and outer lip seals 13, 14 inside the annular channel 15. This space constitutes the pressurizable channel 12 which is pressurized with high pressure gas in an emergency situation for separation of the PERC 1 and with pressurized gas at a pilot pressure level before fueling is commenced and also during normal operation for controlling and monitoring the tightness. Besides this effects, the arrangement with the two lip seals 13, 14 gives the synergistic effects that an extra safety against penetration of humidity, dirt or dust from the outside to the inside of the PERC and an extra safety against leakage of the fueled media from inside the PERC to the outside is obtained. The pressurizable chamber 12 further acts for communication between the actuation line 7 and the monitoring line 8 in the variant with a separate monitoring line 8.

The invention further comprises a control and monitoring method for a pneumatically, high pressure gas powered emergency release coupling (PERC) 1 control and monitoring system S which comprises the steps of:

a) providing the actuation line 7 with a pilot pressure gaseous media, preferably low pressure nitrogen gas, b) providing the pressurizable chamber 12 with pilot pressure gaseous media, c) detecting and controlling said pilot pressure, and d) alerting if said pilot pressure is below a predetermined level, and optionally e) providing the pressurizable chamber 12 with high pressure gaseous media $G_H$ by activating said actuation device 4A, 4B in said actuation line 7 for release of the powered emergency release coupling (PERC) 1, whereby it is possible to detect any leakage as a preventive measure before any fueling is commenced. It is further possible to secure that the system is capable of releasing the PERC in case of an emergency situation.

The method further comprises the steps of:

f) pressure reducing the high pressure gaseous media $G_H$ from the source C of high pressure gaseous media in a first pressure regulator R1 to a pilot pressure gaseous media, and optionally g) pressure reducing the high pressure gaseous media $G_H$ from the source C of high pressure gaseous media in a second pressure regulator R2 arranged upstream the first pressure regulator R1 to a maneuvering pressure level between the high pressure level and the pilot pressure level, whereby it is sufficient with a single source of pressurized gaseous media in order to supply the system with pressurized gas at adequate pressure levels.

The method further comprises the steps of:

h) providing the pilot pressure gaseous media from the monitoring line to the actuation line 7 via said pressurizable chamber 12 or in parallel with the first actuation device 4A, 4B.

Alternative Embodiments

The invention is not limited to the embodiments described above but can be varied within the scope of the following patent claims. For instance it is realized that the actuation devices 4A, 4B can be automatic or manual and that the maneuvering devices may be pneumatic or electrical.

It is further realized that the pressure levels indicated herein is only for example and that the pressure levels are chosen depending on the actual field of application. The instrument pressure level and the pilot pressure level can be the same and can be varied in the ranges which is regulated in personal security aspects.

The invention claimed is:

1. A pneumatically, high pressure gas powered emergency release coupling control and monitoring system (S) comprising a powered emergency released coupling (PERC) arranged in a fluid-supply line for conveying hazardous fluids, said powered emergency released coupling comprising a couple of coupling members provided with mating faces for sealing engagement of the coupling members and formation of a pressurizable chamber between said coupling members, said system (S) comprising an actuation line connected at its one end to the pressurizable chamber and at its other end to a source (C) of high pressure gaseous media ($G_H$), preferably high pressure nitrogen gas, a first actuating device arranged in the actuation line, wherein said system (S) provides a gaseous media at a pilot pressure level to said pressurizable chamber and to said actuation line in a position downstream the first actuation device or via said pressurizable chamber for detection of any leakage of gas in the control and monitoring system (S), said pilot pressure gaseous media preferably being low pressure nitrogen gas.

2. A system (S) according to claim 1 comprising a monitoring line comprising a first pressure regulator (R1), for reducing the high pressure gaseous media ($G_H$) from the high pressure source (C) to the pilot pressure level, and a pressure indicator (PI5), for monitoring the level of the pilot pressure, optionally the system (S) comprises a second pressure regulator (R2) arranged upstream the first pressure regulator (R1), for reducing the high pressure gaseous media ($G_H$) from the high pressure source (C) to a maneuvering pressure level between the high pressure level and the pilot pressure level.

3. A system (S) according to claim 2, wherein said monitoring line is in fluid communication with a first source (C) of high pressure gaseous media ($G_H$) and the pressurizable chamber, and in that said actuation line is in fluid communication with a second source (C) of high pressure gaseous media ($G_H$) and the pressurizable chamber, said monitoring line and said actuation line are in fluid communication with each other via said pressurizable chamber.

4. A system (S) according to claim 2, wherein said monitoring line is arranged in parallel with the first actuation device.

5. A system (S) according to claim 1, wherein activation of said first actuating device is initiated by an initiating signal from a PERC activation device located in a remote position relative the actuating device.

6. A system (S) according to claim 5 comprising several PERC activation devices located in remote positions relative each other.

7. A system (S) according to claim 1, wherein a second actuating device provided with a manual handle is arranged in parallel with the first actuating device.

8. A system (S) according to claim 1, wherein the first actuating device is pneumatically regulated.

9. A control and monitoring method for a pneumatically, high pressure gas powered emergency release coupling (PERC) control and monitoring system (S) according to claim 1, comprising the steps of:

a) providing the actuation line with a pilot pressure gaseous media, preferably low pressure nitrogen gas, b) providing the pressurizable chamber with pilot pressure gaseous media, c) detecting and controlling said pilot pressure, and d) alerting if said pilot pressure is below a predetermined level, and optionally e) providing the pressurizable chamber with high pressure gaseous media ($G_H$) by activating said actuation device in said actuation line for release of the powered emergency release coupling (PERC).

10. A control and monitoring method according to claim 9, comprising the steps of:

f) pressure reducing the high pressure gaseous media ($G_H$) from the source (C) of high pressure gaseous media in a first pressure regulator (R1) to a pilot pressure gaseous media, and optionally g) pressure reducing the high pressure gaseous media ($G_H$) from the source (C) of high pressure gaseous media in a second pressure regulator (R2) arranged upstream the first pressure regulator (R1) to a maneuvering pressure level between the high pressure level and the pilot pressure level.

11. A control and monitoring method according to claim 10, further comprising the steps of:

h) providing the pilot pressure gaseous media from the monitoring line to the actuation line via said pressurizable chamber or in parallel with the first actuation device.

* * * * *